United States Patent
Mani et al.

(10) Patent No.: US 10,240,099 B2
(45) Date of Patent: Mar. 26, 2019

(54) PROCESSES FOR PRODUCING A FUEL FROM A RENEWABLE FEEDSTOCK

(71) Applicant: UOP LLC, Des Plaines, IL (US)

(72) Inventors: Krishna Mani, Gurgaon (IN);
Kanchan Dutta, Kolkata (IN); Avnish Kumar, Alwar (IN); Anjan Ray, New Delhi (IN)

(73) Assignee: UOP LLC, Des Plaines, IL (US)

( * ) Notice: Subject to any disclaimer, the term of this patent is extended or adjusted under 35 U.S.C. 154(b) by 6 days.

(21) Appl. No.: 15/702,568

(22) Filed: Sep. 12, 2017

(65) Prior Publication Data

US 2018/0119036 A1    May 3, 2018

Related U.S. Application Data

(60) Provisional application No. 62/413,882, filed on Oct. 27, 2016.

(51) Int. Cl.
| | |
|---|---|
| *C07C 1/00* | (2006.01) |
| *C10G 1/00* | (2006.01) |
| *C10L 1/08* | (2006.01) |
| *C10G 3/00* | (2006.01) |

(52) U.S. Cl.
CPC .................. *C10L 1/08* (2013.01); *C10G 3/46* (2013.01); *C10G 3/50* (2013.01); *C10G 2300/1014* (2013.01); *C10G 2300/1018* (2013.01); *C10G 2300/805* (2013.01); *C10G 2400/04* (2013.01); *C10L 2270/026* (2013.01)

(58) Field of Classification Search
CPC .................................... C07C 1/00; C10G 1/00
USPC .................................................. 585/240, 242
See application file for complete search history.

(56) References Cited

U.S. PATENT DOCUMENTS

| | | |
|---|---|---|
| 4,310,440 A | 1/1982 | Wilson et al. |
| 4,440,871 A | 4/1984 | Lok et al. |
| 4,758,419 A | 7/1988 | Lok et al. |
| 4,795,623 A | 1/1989 | Evans |
| 4,924,027 A | 5/1990 | Kulprathipanja et al. |
| 4,943,424 A | 7/1990 | Miller |
| 5,082,956 A | 1/1992 | Monnier et al. |

(Continued)

FOREIGN PATENT DOCUMENTS

| | | |
|---|---|---|
| EP | 1888713 A2 | 2/2008 |
| WO | 2006119357 A2 | 11/2006 |

(Continued)

OTHER PUBLICATIONS

Durand, "Heterogeneous Hydrodeoxygenation of Ketones and Alcohols on Sulfided NIO—MOO3/(GAMMA)-AL2O3 Catalyst" J. Catal (1984), v 90, n 1, p. 147-49.

(Continued)

*Primary Examiner* — Thuan D Dang
(74) *Attorney, Agent, or Firm* — Paschall & Maas Law Office; James C. Paschall; Mark Goldberg (57) ABSTRACT

Processes for the production of transportation fuel from a renewable feedstock. A catalyst is used which is more selective to hydrodeoxygenate the fatty acid side chains compared to decarboxylation and decarbonylation reactions. A gaseous mixture of carbon monoxide and hydrogen can be supplied to the conversion zone. Water may also be introduced into the conversion zone to increase the amount of hydrogen.

13 Claims, 2 Drawing Sheets

(56) References Cited

U.S. PATENT DOCUMENTS

| | | |
|---|---|---|
| 5,087,347 A | 2/1992 | Miller |
| 5,158,665 A | 10/1992 | Miller |
| 5,208,005 A | 5/1993 | Miller |
| 5,246,566 A | 9/1993 | Miller |
| 5,510,306 A | 4/1996 | Murray |
| 5,716,897 A | 2/1998 | Galperin et al. |
| 5,741,759 A | 4/1998 | Gee et al. |
| 5,851,949 A | 12/1998 | Galperin et al. |
| 8,648,224 B2 | 2/2014 | Vermeiren et al. |
| 8,753,853 B2 | 6/2014 | Ritter et al. |
| 8,962,905 B2 | 2/2015 | Chapus et al. |
| 2004/0230085 A1 | 11/2004 | Jakkula et al. |
| 2010/0000908 A1 | 1/2010 | Markkanen et al. |
| 2012/0017496 A1* | 1/2012 | Yao .................... B01J 23/96 44/436 |
| 2012/0317872 A1 | 12/2012 | Powell et al. |
| 2013/0174475 A1* | 7/2013 | Kim .................... C10L 1/04 44/307 |
| 2014/0081065 A1 | 3/2014 | Sengupta et al. |
| 2015/0018581 A1 | 1/2015 | Kettunen et al. |
| 2015/0210932 A1 | 7/2015 | Fingland et al. |

FOREIGN PATENT DOCUMENTS

| | | |
|---|---|---|
| WO | 2014159484 A1 | 10/2014 |
| WO | 2015047651 A1 | 4/2015 |

OTHER PUBLICATIONS

Veriansyah, "Production of renewable diesel by hydroprocessing of soybean oil: Effect of catalysts" Fuel (2012), v 94, p. 578-585.

Wang, "Effects of Co on Ni—Mo—B Amorphous Catalyst in Hydrodeoxygenation" CIESC Journal (Jan. 2010), v 61, n 1, p. 73-79.

Miller, New molecular sieve process for lube dewaxing by wax isomerization, Microporous Materials 2 (1994) 439-449.

PCT Search Report dated Dec. 28, 2017 for corresponding PCT Application No. PCT/US2017/052608.

\* cited by examiner

PROCESSES FOR PRODUCING A FUEL FROM A RENEWABLE FEEDSTOCK

CROSS-REFERENCE TO RELATED APPLICATION

This application claims priority from Provisional Application No. 62/413,882 filed Oct. 27, 2016, the contents of which cited application are hereby incorporated by reference in its entirety.

FIELD OF THE INVENTION

This invention relates generally to processes for the conversion of oils from a renewable feedstock to diesel fuel and more particularly to processes which minimize the loss of carbon atoms during such processes.

BACKGROUND OF THE INVENTION

The use of biofuels is becoming more and more popular around the world especially based upon concerns from limited petroleum resources, increasing energy demand, greenhouse gas emissions and related climate change concerns. In addition to producing petroleum derived fuels, the fuels can also be manufactured using carbon and hydrogen derived from organic biomass, such as vegetable oils, organic fats, and organic greases.

For example, biological oils and fats can be converted into diesel, naphtha and jet fuels using many different processes, such as hydro-deoxygenation and hydro-isomerization processes. Diesel fuel refers to a mixture of carbon chains that generally contain between 8 and 21 carbon atoms per molecule. Typically, diesel has a boiling point in the range of 180 to 380° C. (356 to 716° F.). The production of diesel fuel can be either petroleum-derived or biologically-sourced. Petroleum-derived diesel is produced from the fractional distillation of crude oil, refining products, or by conversion processes. On the other hand, biologically-sourced diesel fuel is derived from renewable feedstock, such as vegetable oils or animal fats.

The biologically-sourced diesel fuel is desirable for a variety of reasons. In addition to the ecological benefits of using biologically-sourced diesel fuel, there exists a market demand for such fuel. For diesel purchasers, the use of biologically-sourced diesel fuel can be promoted in public relations. Also, certain governmental policies may require or reward use of biologically-sourced fuels. Finally, fluctuation of crude oil prices is also a reason refiners may choose to produce biologically-sourced fuels. The biologically-sourced diesel fuel is usually classified into two categories, biodiesel and green diesel.

Biodiesel (also referred to as fatty acid methyl ester, or FAME) mainly consists of long-chain alkyl esters typically mono-alkyl ester products derived from a lipid feedstock. The chemical structure of biodiesel is distinctly different from petroleum-derived diesel, and therefore biodiesel has somewhat different physical and chemical properties from petroleum-derived diesel. For example, biodiesel has a much higher oxygen content than petroleum-derived diesel.

Green diesel (also referred to as renewable hydrocarbon diesel, hydroprocessed vegetable oils or HVO), on the other hand, is substantially the same chemically as petroleum-derived diesel, but green diesel is made from recently living biomass. Unlike biodiesel, which is an ester and has different chemical properties from petroleum diesel, green diesel is composed of long-chain hydrocarbons, and can be mixed with petroleum diesel in any proportion for use as transportation fuel. Green diesel resembles petroleum-derived diesel fuel and usually has a very low heteroatom (nitrogen, oxygen, sulfur) content. Green diesel can thus be produced to be indistinguishable from petroleum diesel. This is beneficial because no changes to fuel infrastructure or vehicle technology are required for green diesel and it may be blended in any proportion with petroleum-derived diesel fuel as it is stable, not oxygenated. Further, unlike FAME biodiesel technology which produces glycerin as a by-product, the production of green diesel generates valuable co-products like naphtha, liquefied petroleum gas components like propane and butane, and fuel gases like methane and ethane.

The production of green diesel from some biomasses, such as vegetable oils, consumes large amounts of hydrogen. In some areas, hydrogen is not abundantly available and therefore, reactions that require large amounts of hydrogen may be economically unviable. However, even if areas in which hydrogen is available, the required hydrogen is an added cost for a refiner. In addition to having high hydrogen demands, the decarboxylation, decarbonylation, and hydrodeoxygenation reactions associated with converting the triglycerides found in the oils into paraffins typically produce large amounts of water.

Three main reactions are involved in producing the n-paraffin in presence of hydrogen for jet/diesel production are:

(Decarboxylation)$C_nH_{2n+1}COOR + H_2 = C_nH_{2n+2} + CO_2 + RH$;

(Decarbonylation)$C_nH_{2n+1}COOR + 2H_2 = C_nH_{2n+2} + CO + H_2O + RH$; and, (Hydrodeoxygenation)$C_nH_{2n+1}COOR + 4H_2 = C_{n+1}H_{(2n+2)} + 2H_2O + RH$.

Thus, deoxygenation could be achieved either by removal as water with hydrogen (hydrodeoxygenation), as carbon dioxide ($CO_2$) (decarboxylation), as carbon monoxide (CO) (decarbonylation). As will be appreciated, decarboxylation and decarbonylation will result in the loss of carbon from the produced paraffin as the ester group is removed as carbon dioxide and carbon monoxide, respectively. On the other hand, hydrodeoxygenation maintains the carbon on the produced paraffin—increasing liquid yield and water production. It is believed that hydrodeoxygenation is preferred over decarboxylation and decarbonylation based upon the cost of the additional hydrogen consumption being less than the increased liquid yield (based upon current cost assumptions). Over and above these three key reactions, any double bonds present in the fatty acid side chains also undergo hydrogenation to produce saturated fatty acid side chains.

Therefore, it would be desirable to have one or more processes that allow for effective and efficient conversion of triglycerides into paraffins which reduces the amount of decarboxylation and decarbonylation.

SUMMARY OF THE INVENTION

One or more processes have been invented for producing a transportation fuel from a biomass oil in which the amount of decarboxylation and decarbonylation is reduced by utilizing a catalyst that has a higher selectivity for hydrodeoxygenation compared to decarboxylation and decarbonylation.

In a first embodiment of the invention, the present invention may be characterized broadly as providing a process for converting a renewable feedstock into a transportation fuel by: removing oxygen atoms from a renewable feedstock in a conversion zone, wherein the conversion zone comprises a catalyst configured to selectively remove oxygen from molecules in the renewable feedstock, and wherein the catalyst comprises at least cobalt and molybdenum on a support, and wherein the catalyst has a higher selectivity for hydrodeoxygenation compared to decarboxylation and decarbonylation.

In at least one embodiment, the conversion zone receives a stream of hydrogen containing gas. It is contemplated that the hydrogen containing gas includes a mixture of carbon monoxide and hydrogen.

In at least one embodiment, the support of the catalyst comprises alumina and amorphous silica alumina.

In at least one embodiment, the catalyst is water tolerant.

In at least one embodiment, the catalyst comprises between about 8 to 20 wt % molybdenum. It is contemplated that the catalyst comprises between about 2 to 8 wt % cobalt. It is also contemplated that the catalyst is sulfided. It is further contemplated the catalyst is substantially free of nickel. It is even further contemplated that the catalyst is water tolerant.

In a second aspect of the present invention, the present invention may be broadly characterized as providing a process for converting a renewable feedstock into a transportation fuel by: passing a renewable feedstock into a conversion zone, the conversion zone receiving a hydrogen containing gas stream and containing a catalyst configured to selectively remove oxygen from molecules in the renewable feedstock, wherein the catalyst has a higher selectivity for hydrodeoxygenation compared to decarboxylation and decarbonylation, and wherein the catalyst is water tolerant.

In at least one embodiment, the catalyst comprises at least cobalt and molybdenum on a support. It is contemplated that the support comprises alumina. It also is contemplated that the support further comprises amorphous silica alumina.

In at least one embodiment, the hydrogen containing gas includes a mixture of carbon monoxide and hydrogen.

In at least one embodiment, the catalyst comprises between about 8 to 20 wt % molybdenum and between about 2 to 8 wt % cobalt. It is contemplated that the catalyst is sulfided.

In at least one embodiment, the hydrogen containing gas includes a mixture of carbon monoxide and hydrogen.

A process for converting a renewable feedstock into a transportation fuel by: passing a renewable feedstock into a conversion zone, the conversion zone receiving a hydrogen containing gas stream and containing a catalyst configured to remove oxygen from the renewable feedstock, wherein the catalyst comprises between about 8 to 20 wt % molybdenum and between about 2 to 8 wt % cobalt on a support, wherein the support comprises alumina and amorphous silica alumina.

In at least one embodiment, the conversion zone also receives water.

Additional aspects, embodiments, and details of the invention, all of which may be combinable in any manner, are set forth in the following detailed description of the invention

BRIEF DESCRIPTION OF THE DRAWINGS

One or more exemplary embodiments of the present invention will be described below in conjunction with the following drawing figures, in which.

DETAILED DESCRIPTION OF THE INVENTION

As mentioned above, the present invention provides one or more processes for producing a transportation fuel, such as diesel fuel, from renewable sources. These renewable sources include, but are not limited to, plant oils such as corn, rapeseed, canola, soybean and algal oils, animal fats such as tallow, fish oils and various waste streams such as yellow and brown greases, dairy sludge, used or recycled cooking oil, by-products from edible oil refining such as palm stearin or palm fatty acid distillate or recovered oils from spent bleaching earth, and sewage sludge. The common feature of these sources is that they are composed of glycerides and Free Fatty Acids (FFA). Both of these classes of compounds contain aliphatic carbon chains having from 8 to 24 carbon atoms. The aliphatic carbon chains in the glycerides or FFAs can be saturated or mono-, di- or poly-unsaturated.

The term renewable feedstock is meant to include feedstocks other than those derived from petroleum crude oil. The renewable feedstocks that can be used in the present invention include any of those which comprise glycerides and FFAs. Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, fats in milk, fish oil, algal oil, microbial oils, sewage sludge lipids, and the like. Additional examples of renewable feedstocks include non-edible vegetable oils such as *Jatropha curcas* (Ratanjot, Wild Castor, Jangli Erandi), *Madhuca indica* (Mohuwa), *Pongamia pinnata* (Karanji Honge), *Calophyllum inophyllum, Moringa oleifera, Glycerrhizia glabra* and *Azadiracta indicia* (Neem). The glycerides and FFAs of the typical vegetable or animal fat contain aliphatic hydrocarbon chains in their structure which have 8 to 24 carbon atoms with a majority of the fats and oils containing high concentrations of fatty acids with 16 and 18 carbon atoms.

With these general principles in mind, one or more embodiments of the present invention will be described with the understanding that the following description is not intended to be limiting.

Figure 1:
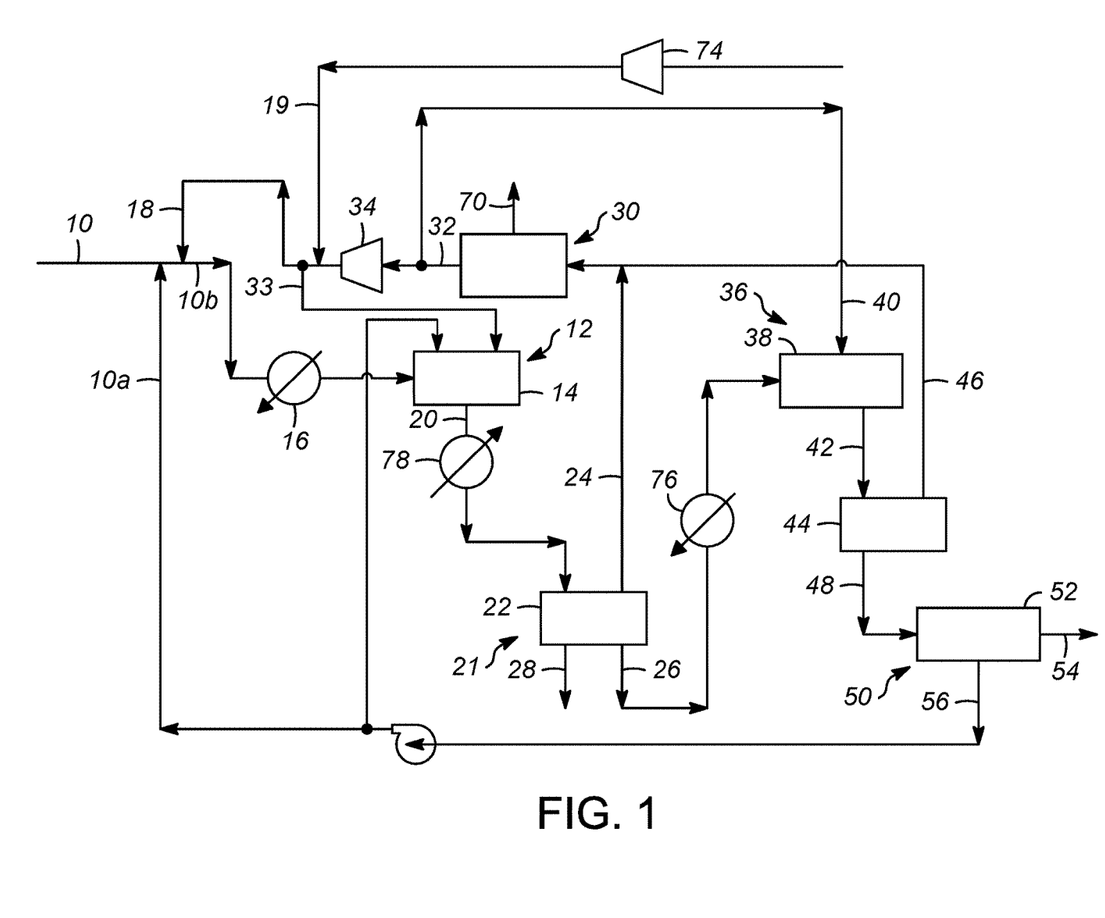
FIG. 1 shows a process flow diagram according to one or more embodiments of the present invention; and, FIG. 2 shows another process flow diagram of one or more embodiments of the present invention

As shown in FIG. 1, a renewable feedstock 10 is passed to a first conversion or reaction zone 12 comprising one or more catalyst beds in one or more reactors 14. The term "feedstock" is meant to include feedstocks that have not been treated to remove contaminants as well as those feedstocks purified in a pretreatment zone (not shown). The feedstock 10 is preferably heated, for example in a heat exchanger 16, prior to entering the reactor 14. Additionally, the feedstock 10 may be combined with a partially uncovered stream 10a (discussed below) to form a combined feedstock 10b.

In addition to the feedstock 10, a gaseous stream 18 is also passed to the reactor 14 of the first reaction zone 12. The gaseous stream 18 may comprise hydrogen or a mixture of carbon monoxide and hydrogen. It is known to use carbon monoxide as a reducing agent to remove oxygen atoms from the fatty acids in glycerides. See, EP 2 177 587. While the carbon monoxide may function to remove the oxygen atoms from the fatty acids, the lack of hydrogen will result in the production of unsaturated hydrocarbons. This can lead the oligomerization and adversely impact product quality and foul production lines. However, it has been discovered that processes to produce transportation fuel from a renewable resource can utilize a mixture of hydrogen and carbon monoxide to convert the components of a renewable feedstock to transportation fuel. In addition to requiring less hydrogen, the processes will produce minimal amounts of water.

The gaseous stream 18 may comprise one or more recycle gas streams (discussed below) as well as a makeup stream 19 from a source of carbon monoxide and hydrogen. The makeup stream 19 may comprise synthesis gas and passes through compressor 74. The synthesis gas may be obtained from the gasification of coal or coke or from the steam reforming of methane. Additionally and alternatively, the synthesis gas may be obtained from the gasification of biomass, including municipal solid waste, plant residues from agriculture or forestry or aquatic organisms. However, as such a process produces nitrogen gas, it is unknown what, if any, impact the nitrogen will have, for example, forming ammonia in the system. Therefore, it is preferable that the synthesis gas is nitrogen free. This may be accomplished by biomass catalyst partial oxidation or by air separation to remove nitrogen upstream of the gasifier.

Another potential source of carbon monoxide and hydrogen for the gaseous stream 18 is from a steel production processes which typically dispose of large volumes of specialty gases. In steel production, three different process stages, from coal to steel, provide three different gas types: coke gas, blast furnace gas and converter gas. Coke gas comprises between 50 to 70 mol % hydrogen, 25 to 30 mol % methane, 10 to 20 mol % of carbon monoxide, and small amounts of carbon dioxide and nitrogen. Blast furnace gas comprises about 20 mol % carbon monoxide and about 5 mol % hydrogen. Converter gas comprises about 65 mol % carbon monoxide with small amount of hydrogen, 15 mol % carbon dioxide, and 15 mol % nitrogen. Another potential source of carbon monoxide and hydrogen is from an FCC off gas and refinery off gas stream. Both of these streams may have carbon monoxide and hydrogen.

Additionally, yet another source of carbon monoxide and hydrogen for gaseous stream 18 may be a refinery gas stream such as a stream from downstream of a reformer and upstream of a shift reactor. Typically such gas comprises about 70% hydrogen and 20% carbon monoxide and the balance of carbon dioxide and methane. Such a gas may not require acid gas/nitrogen gas removal. In addition to the preferred removal of nitrogen gas and even though carbon dioxide is inert, the effect of the carbon dioxide on the catalyst is unclear. Accordingly, it is preferred that the gas is treated to remove carbon dioxide as well. Utilizing an off gas or gas stream from such refinery processes is beneficial because such streams are readily available and cost effective source of the gaseous stream that may be utilized in the processes of the present invention. Additionally, the utilization of such a gaseous stream will minimize the amount of gas passed to a PSA unit. Indeed, as the present invention utilizes a gaseous stream having a mixture of hydrogen and carbon monoxide, there is no need to obtain pure (i.e., >99.999% hydrogen) gas.

Returning to FIG. 1, in the first reaction zone 12, the feedstock 10 is contacted with a catalyst in the presence of hydrogen and carbon monoxide at hydrogenation conditions to hydrogenate the olefinic or unsaturated portions of the n-paraffinic chains and deoxygenate the oxygenated hydrocarbons.

Hydrogenation conditions include a temperature of 100 to 500° C. (212 to 932° F.) and a pressure of 689 kPa absolute (100 psia) to 13,790 kPa absolute (2000 psia). In another embodiment the hydrogenation conditions include a temperature of 200 to 300° C. (392 to 572° F.) and a pressure of 1379 kPa absolute (200 psia) to 4826 kPa absolute (700 psia). Other operating conditions for the hydrogenation zone are well known in the art.

As mentioned above, it is believed that it is more desirable to promote hydrodeoxygenation compared to decarboxylation and decarbonylation, and therefore, according to various aspects an embodiments of the present invention, the catalyst in the first reaction zone 12 has a higher selectivity for hydrodeoxygenation compared to decarboxylation and decarbonylation comprises. As discussed below, it was surprisingly and unexpectedly discovered that one particular formulation for such a catalyst comprises a mixture of cobalt and molybdenum on a support that comprises alumina and amorphous silica alumina. More particularly, the catalyst comprises between about 8 to 20 wt % molybdenum, or about 10 wt % molybdenum. The term "about" it is meant to include values+/−10% of the stated value, or +/−5% of the stated value, or +/−1% of the stated value. The catalyst may also comprises between about 2 to 8 wt % cobalt, or about 2.5 wt % cobalt. In at least one embodiment, the catalyst comprises about 10 wt % molybdenum and about 2.5 wt % cobalt In some embodiments, the catalyst may be substantially free of nickel. Furthermore, in addition to promoting hydrodeoxygenation over decarboxylation and decarbonylation, it is preferred that the catalyst is water tolerant.

In the present case, it is believed that cobalt/molybdenum may be desirable because cobalt will forms dicobaltoctacarbonyl and molybdenum will form molybdenumhexacarbonyl. Both of these compounds are unstable, and will decompose readily into the zero valent metal and carbon monoxide gas, and hence will not render carbon monoxide or metal surface catalysts unusable. Rather, the formation of carbonyl in-situ may possibly provide a reaction pathway for carbon monoxide based reduction.

While the catalyst may be sulfided, it is contemplated that the catalyst is a non-sulfided catalyst when the stream is carbon monoxide rich and does not contain much hydrogen. Triglycerides, being low on sulfur, may cause leaching of sulfur from sulfided catalyst and the high oxygen content will damage the sulfide structure of the catalyst. Additionally, studies have revealed that poly-condensation products formed have shortened the life by deactivation. Alumina, in this context, is quite susceptible to deactivation by coke formation. However, when the gas comprises hydrogen and carbon monoxide, it is preferred that the catalyst is partially sulfided so that the hydrogen consumption from any side reactions due to lack of catalyst activity is minimized. Additionally, it is contemplated that sulfiding can be used to tune the activity of the catalyst. The carbon monoxide present may react to some extent with the sulfur to form COS, which could be removed by amine wash or adsorption. In order to maintain the catalyst in a partially sulfided state, a sulfiding agent may be added to the feedstock 10 or may be introduced into the reactor 14 separately from the feedstock 10.

Generally, hydrodeoxygenation conditions include a relatively low pressure of 3,447 kPa (500 psia) to 6,895 kPa (1,000 psia), a temperature of 200 to 400° C. (392 to 752° F.) and a liquid hourly space velocity of 0.5 to 10 $hr^{-1}$. In another embodiment the hydrodeoxygenation conditions include the same relatively low pressure of 3,447 kPa (500 psia) to 6,895 kPa (1000 psia), a temperature of 288 to 345° C. (550 to 653° F.) and a liquid hourly space velocity of 1 to 4 hr$^1$.

Returning to FIG. 1, an effluent 20 from the first reaction zone 12 may pass through heat exchanger 78 and be introduced to a separation zone 21 having a phase separator 22. Hydrogen, carbon oxides, possibly hydrogen sulfide and $C_3$-hydrocarbons are separated and removed in line 24 and liquid hydrocarbons are removed in line 26. Water may also be removed from the phase separator 22 in a line 28. Alternatively, although not depicted as such, the water may be removed as a vapor in line 24.

Since the vapor in line 24 from the phase separator 22 comprises a large quantity of hydrogen and carbon monoxide it may be used as a recycle gas stream. The carbon dioxide in the vapor in line 24 can be removed from the hydrogen and carbon monoxide in a scrubbing zone 30. The scrubbing zone 30 may comprise any well-known systems in the art, such as reaction with a hot carbonate solution, pressure swing adsorption, absorption with an amine in processes, etc. If desired, essentially pure carbon dioxide 70 can be recovered by regenerating the spent absorption media. Thus, the vapor in line 24 is passed through one or more scrubbing zones 30 to remove carbon dioxide and hydrogen sulfide and provide a scrubbed recycle gas 32. The scrubbed recycle gas 32 will comprise the $C_3$-hydrocarbons, hydrogen, and carbon monoxide and may be compressed in a recycle gas compressor 34 and used as a recycle gas stream form a portion of the gaseous stream 18. Additionally, a portion of the scrubbed recycle gas may be utilized to isomerize hydrocarbons (discussed below) and can be from a suction or discharge of the recycle gas compressor 34. Furthermore, it is contemplated that a portion of the scrubbed recycled gas is passed back to the reactor 14 in the reaction zone 12 as a quench fluid in line 33 to control the temperature in the reactor 14.

Returning to the phase separator 22, the liquid hydrocarbons removed from the phase separator 22 in line 26 will have poor cold flow properties because it comprises essentially normal paraffins. In order to improve the cold flow properties of the liquid hydrocarbon fraction, the liquid hydrocarbons in line 26 may pass through heat exchanger 76 and 4 can be passed to an isomerization zone 36. As will be appreciated, the isomerization zone 36 comprises one or more reactors 38 which contain an isomerization catalyst and which are operated under isomerization conditions to at least partially isomerize the normal paraffins to branched paraffins. Additionally, a hydrogen containing gas 40 is also passed to the isomerization zone 36, and as mentioned above, the hydrogen containing gas 40 may comprise a portion of the scrubbed recycle gas 32.

In the isomerization zone 36, only minimal branching of the hydrocarbons is required, enough to overcome cold-flow problems of the normal paraffins. Since attempting for significant branching runs the risk of high degree of undesired cracking, the predominant isomerized product is a mono-branched hydrocarbon. An isomerized effluent 42 of the isomerization zone 36 comprises a branched-paraffin-rich stream. By the term "rich" it is meant that the isomerized effluent 42 has a greater concentration of branched paraffins than the hydrocarbons entering the isomerization zone 36, and preferably comprises greater than 50 mass-% branched paraffins. It is envisioned that the isomerized effluent 42 comprises 70, 80, or 90 mass-% branched paraffins.

The isomerization of the liquid hydrocarbons in line 26 can be accomplished in any manner known in the art or by using any suitable catalyst known in the art. One or more beds of catalyst may be used within the reactor(s) 38 in the isomerization zone 36. It is preferred that the isomerization be operated in a co-current mode of operation. Fixed bed, trickle bed down flow or fixed bed liquid filled up-flow modes are both suitable. See also, for example, US 2004/0230085. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials may include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48. ZSM-50, ZSM-57, MeAPO-11, MeAPO-31, MeAPO-41, MgAPSO-11, MgAPSO-31, MgAPSO-41, MgAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449.

Isomerization conditions may include a temperature between 200 to 400° C. (392 to 752° F.) and a pressure between 1724 kPa absolute (250 psia) to 4726 kPa absolute (700 psia). In another embodiment the isomerization conditions include a temperature between 300 to 360° C. (572 to 680° F.) and a pressure between 3102 kPa absolute (450 psia) to 3792 kPa absolute (550 psia). Other operating conditions for the isomerization zone are well known in the art.

The isomerized effluent 42 may be passed to a separator vessel 44 to separate liquids and vapor, with the vapor being withdrawn in a line 46 and the liquid being withdrawn in a line 48. As the vapor in line 46 may comprise hydrogen and carbon monoxide, it may passed as a recycle gas stream to scrubbing zone(s) 30 (discussed above) which provide the scrubbed recycle gas 32. Although it is depicted that the two recycle gas streams are combined, this is merely a preferred embodiment.

The liquid in line 48 from the separator vessel 44 can be passed to a fractionation zone 50 having one or more fractionation columns 52 to separate one or more transportation fuels streams 54 from a bottoms stream 56. Additionally, other streams may likewise be withdrawn from the fractionation columns 52, including for example, a naphtha stream, propane, butane, pentane, and LPG streams to name a few.

The transportation fuel stream 54 preferably comprises a side draw stream from the fractionation column 52 and in most preferred embodiment comprises a diesel boiling range fuel stream. The bottoms stream 56 from the fractionation column 52 may comprise partially unconverted glycerides. Thus, the bottoms stream may be to reaction zone 12 as the partially unconverted stream 10a (discussed above). Additionally, a portion of the bottoms stream 56 from the fractionation column 52 may also be used as cool quench liquid between beds of one of the reaction zone 12 to further control the heat of reaction and provide quench liquid for emergencies. The recycle stream may be introduced to the inlet of one the reaction zone 12 and/or to any subsequent beds or reactors. One benefit of the hydrocarbon recycle is to control the temperature rise across the individual beds.

Figure 2:
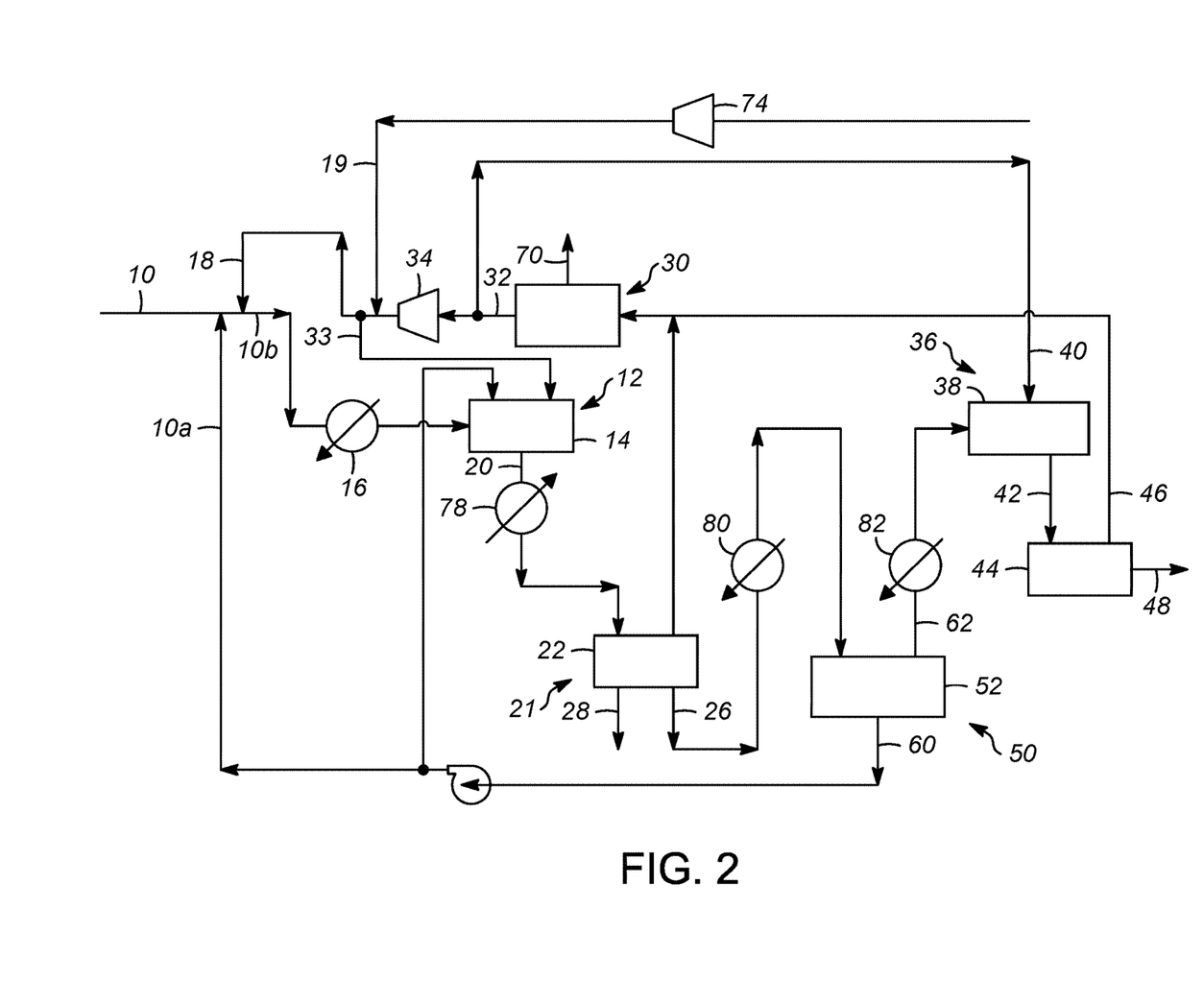

With reference to FIG. 2, another embodiment of the present invention is shown, in which the fractionation zone 50 is disposed between the phase separator 22 of the separation zone 21 and the isomerization zone 36.

In this embodiment, the liquid hydrocarbons in line 26 are passed first to the fractionation zone 50 in which one or more fractionation columns 52 will separate the liquid hydrocarbons into a heavy effluent 60 and a light effluent 62. The heavy effluent 60 will comprise some unconverted feed and therefore may be used as a quench fluid, as a partially unconverted stream 10a or both, similar to the bottoms stream 56 discussed above in regards to FIG. 1.

The light effluent 62 comprises diesel range hydrocarbons and lighter compounds. Thus, the light effluent 62 is passed to the isomerization zone 36 to improve the cold flow properties of the diesel range hydrocarbons. The isomerization zone 36 is described in detail above with respect to the embodiments shown in FIG. 1.

From the isomerization zone 36, the isomerized effluent 42 can be passed to the separator vessel 44 in which the isomerized effluent 42 will separate with the vapor being withdrawn in the line 46 and the liquid being withdrawn in the line 48. The gaseous component in line 46 can be used as a recycle gas stream as discussed above. The liquid in line 48 may comprise the desired transportation fuel, preferably, a diesel boiling range fuel. Additionally, other streams may be separated from either the gaseous component or the liquid component, such as, a naphtha, propane, butane, pentane, or LPG stream to name a few.

EXPERIMENTAL EXAMPLES

Various experimental examples were conducted using a feed, derived from soybean oil, having approximately 11% by mass $C_{16}$ hydrocarbons and approximately 85% by mass $C_{18}$ hydrocarbons. A nickel/molybdenum catalyst (HDN-1) was used for some of the experiments, and a naphtha hydrotreating cobalt/molybdenum catalyst (HYT-1118) was used for some of the experiments. Both catalysts were sulfide and utilized with relatively pure hydrogen gas. The reactor pressure was 10.34 MPa (1500 psig) and a temperature of 300° C. (572° F.) was utilized.

The compositions of the liquid products (in wt %) are shown in the below Table 1 and the composition of the gaseous product (in mol %) are shown in the below Table 2.

TABLE 1

|  | CoMo-1 | CoMo-2 | NiMo-1 | NiMo-2 |
| --- | --- | --- | --- | --- |
| C3 | 0.253 | 0.008 | 0.286 | 0.072 |
| C4 to C14 | 0.986 | 0.300 | 0.972 | 0.585 |
| nC15 | 1.164 | 1.093 | 4.756 | 4.909 |
| iC15 | 0.019 | 0.015 | 0.176 | 0.191 |
| nC16 | 8.776 | 8.919 | 5.174 | 4.927 |
| iC16 | 0.086 | 0.075 | 0.246 | 0.256 |
| nC17 | 9.370 | 8.717 | 38.416 | 39.907 |
| iC17 | 1.116 | 0.987 | 3.345 | 3.589 |
| nC18 | 64.965 | 66.564 | 36.678 | 35.282 |
| iC18 | 6.802 | 7.179 | 3.568 | 3.545 |
| C19-C24 | 2.593 | 2.513 | 2.530 | 2.557 |
| Intermediates | 4.126 | 3.639 | 4.139 | 4.252 |
| Glycerides | 0.000 | 0.000 | 0.000 | 0.000 |
| Triglycerides | 0.000 | 0.000 | 0.000 | 0.000 |
| Sum | 100.00 | 100.00 | 100.00 | 100.00 |

TABLE 2

|  | CoMo-1 | CoMo-2 | NiMo-1 | NiMo-2 |
| --- | --- | --- | --- | --- |
| $N_2$ | 6.710 | 4.930 | 5.868 | 6.371 |
| $H_2$ | 83.853 | 84.522 | 75.205 | 77.028 |
| CO | 0.133 | 0.133 | 1.049 | 0.950 |
| $CO_2$ | 2.928 | 2.786 | 10.136 | 9.626 |
| C1 | 0.284 | 0.222 | 0.446 | 0.429 |
| C2 | 0.110 | 0.117 | 0.029 | 0.027 |
| C3 | 5.819 | 7.208 | 6.874 | 5.411 |
| C4 | 0.015 | 0.027 | 0.141 | 0.106 |
| C5+ | 0.148 | 0.055 | 0.199 | 0.004 |
| Sum | 100.00 | 100.00 | 99.95 | 99.95 |

Based upon the above data, it can be seen that the cobalt/molybdenum catalyst maintained the carbon on the deoxygenated hydrogen. More specifically, with respect to C16 hydrocarbons, the average yield loss of the cobalt/molybdenum catalyst was 19.6%, compared to an average yield loss of 52.2% for the nickel/molybdenum catalyst. For C18 hydrocarbons, the average yield loss for the cobalt/molybdenum catalyst was 13.8%, compared to an average yield loss of 53.2% for the nickel/molybdenum catalyst.

From the data in the above Tables, the selectivity towards hydrodeoxygenation (defined by $Cn/(Cn+C(n-1))$) for the cobalt/molybdenum catalyst was 80.4% (C16) and 86.2% (C18) compared to 47.8% (C16) and 46.8% (C18) for the nickel/molybdenum catalyst. Thus, while the nickel/molybdenum catalyst may operate as an effective catalyst for deoxygenation, the cobalt/molybdenum catalyst was much more selective to the hydrodeoxygenation reaction. It is believed that improvement is expected in practice as the pressure and hydrogen supply was not constant in these experiments.

Based upon the foregoing, the use of certain catalysts which are more selective to hydrodeoxygenation reactions compared to decarboxylation and decarbonylation. By utilizing such a catalyst, product yield from the deoxygenation should increase, providing an increase in return that should outweigh any costs associated with supplying hydrogen. The costs associated with supplying hydrogen can be lowered further by utilizing a carbon monoxide reducing agent, as well as by introducing water into the conversion zone.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Specific Embodiments

While the following is described in conjunction with specific embodiments, it will be understood that this description is intended to illustrate and not limit the scope of the preceding description and the appended claims.

A first embodiment of the invention is a process for converting a renewable feedstock into a transportation fuel, the process comprising removing oxygen atoms from a renewable feedstock in a conversion zone, wherein the conversion zone comprises a catalyst configured to selectively remove oxygen from molecules in the renewable feedstock, and wherein the catalyst comprises at least cobalt and molybdenum on a support, and wherein the catalyst has a higher selectivity for hydrodeoxygenation compared to decarboxylation and decarbonylation. An embodiment of the invention is one, any or all of prior embodiments in this paragraph up through the first embodiment in this paragraph wherein the conversion zone receives a stream of hydrogen containing gas. An embodiment of the invention is one, any or all of prior embodiments in this paragraph up through the first embodiment in this paragraph wherein the hydrogen containing gas includes a mixture of carbon monoxide and hydrogen. An embodiment of the invention is one, any or all of prior embodiments in this paragraph up through the first embodiment in this paragraph wherein the support of the catalyst comprises alumina and amorphous silica alumina. An embodiment of the invention is one, any or all of prior embodiments in this paragraph up through the first embodiment in this paragraph wherein the catalyst is water tolerant. An embodiment of the invention is one, any or all of prior embodiments in this paragraph up through the first embodiment in this paragraph wherein the catalyst comprises between about 8 to 20 wt % molybdenum. An embodiment of the invention is one, any or all of prior embodiments in this paragraph up through the first embodiment in this paragraph wherein the catalyst comprises between about 2 to 8 wt % cobalt. An embodiment of the invention is one, any or all of prior embodiments in this paragraph up through the first embodiment in this paragraph wherein the catalyst is sulfided. An embodiment of the invention is one, any or all of prior embodiments in this paragraph up through the first embodiment in this paragraph wherein the catalyst is substantially free of nickel. An embodiment of the invention is one, any or all of prior embodiments in this paragraph up through the first embodiment in this paragraph wherein the catalyst is water tolerant.

A second embodiment of the invention is a process for converting a renewable feedstock into a transportation fuel, the process comprising passing a renewable feedstock into a conversion zone, the conversion zone receiving a hydrogen containing gas stream and containing a catalyst configured to selectively remove oxygen from molecules in the renewable feedstock, wherein the catalyst has a higher selectivity for hydrodeoxygenation compared to decarboxylation and decarbonylation, and wherein the catalyst is water tolerant. An embodiment of the invention is one, any or all of prior embodiments in this paragraph up through the second embodiment in this paragraph wherein the catalyst comprises at least cobalt and molybdenum on a support. An embodiment of the invention is one, any or all of prior embodiments in this paragraph up through the second embodiment in this paragraph wherein the support comprises alumina. An embodiment of the invention is one, any or all of prior embodiments in this paragraph up through the second embodiment in this paragraph wherein the support further comprises amorphous silica alumina. An embodiment of the invention is one, any or all of prior embodiments in this paragraph up through the second embodiment in this paragraph wherein the hydrogen containing gas includes a mixture of carbon monoxide and hydrogen. An embodiment of the invention is one, any or all of prior embodiments in this paragraph up through the second embodiment in this paragraph wherein the catalyst comprises between about 8 to 20 wt % molybdenum and between about 2 to 8 wt % cobalt. An embodiment of the invention is one, any or all of prior embodiments in this paragraph up through the second embodiment in this paragraph wherein the catalyst is sulfided. An embodiment of the invention is one, any or all of prior embodiments in this paragraph up through the second embodiment in this paragraph wherein the hydrogen containing gas includes a mixture of carbon monoxide and hydrogen.

A third embodiment of the invention is a process for converting a renewable feedstock into a transportation fuel, the process comprising passing a renewable feedstock into a conversion zone, the conversion zone receiving a hydrogen containing gas stream and containing a catalyst configured to remove oxygen from the renewable feedstock, wherein the catalyst comprises between about 8 to 20 wt % molybdenum and between about 2 to 8 wt % cobalt on a support, wherein the support comprises alumina and amorphous silica alumina. An embodiment of the invention is one, any or all of prior embodiments in this paragraph up through the third embodiment in this paragraph wherein the conversion zone also receives water.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodi-

The invention claimed is:

1. A process for converting a renewable feedstock into a transportation fuel, the process comprising:

removing oxygen atoms from molecules having a formula $C_nH_{2n+1}COOR$ in a renewable feedstock in a conversion zone under hydrogenation conditions, wherein the conversion zone comprises a catalyst configured to selectively remove oxygen from said molecules in the renewable feedstock, and wherein the catalyst comprises 2-8 wt % cobalt and 8-20 wt % molybdenum on a support, and wherein the catalyst has a higher selectivity for hydrodeoxygenation compared to decarboxylation and decarbonylation separating liquid hydrocarbons from an effluent from said conversion zone;

isomerizing said liquid hydrocarbons to produce an isomerized effluent having a greater concentration of branched paraffins than said liquid hydrocarbons; and fractionating said isomerized effluent to recover one or more transportation fuel streams.

2. The process of claim 1 wherein the conversion zone receives a stream of hydrogen containing gas.

3. The process of claim 2 wherein the hydrogen containing gas includes a mixture of carbon monoxide and hydrogen.

4. The process of claim 1 wherein the support of the catalyst comprises alumina and amorphous silica alumina.

5. The process of claim 1 wherein the catalyst is water tolerant.

6. The process of claim 1 wherein the catalyst is sulfided.

7. The process of claim 6 wherein the catalyst is substantially free of nickel.

8. A process for converting a renewable feedstock into a transportation fuel, the process comprising:

passing a renewable feedstock into a conversion zone under hydrogenation conditions, the conversion zone receiving a hydrogen containing gas stream comprising a mixture of hydrogen and carbon monoxide and containing a catalyst configured to selectively remove oxygen from molecules in the renewable feedstock, wherein said molecules have a formula $C_nH_{2n+1}COOR$ and wherein the catalyst has a higher selectivity for hydrodeoxygenation compared to decarboxylation and decarbonylation, and wherein the catalyst comprises 2-8 wt % cobalt and 8-20 wt % molybdenum on a support;

separating liquid hydrocarbons from an effluent from said conversion zone;

isomerizing said liquid hydrocarbons to produce an isomerized effluent having a greater concentration of branched paraffins than said liquid hydrocarbons; and fractionating said isomerized effluent to recover one or more transportation fuel streams.

9. The process of claim 8 wherein the support comprises alumina.

10. The process of claim 9 wherein the support further comprises amorphous silica alumina.

11. The process of claim 8 wherein the catalyst is sulfided.

12. A process for converting a renewable feedstock into a transportation fuel, the process comprising:

passing a renewable feedstock into a conversion zone under hydrogenation conditions, the conversion zone receiving a hydrogen containing gas stream and containing a catalyst configured to remove oxygen from molecules having a formula $C_nH_{2n+1}COOR$ in the renewable feedstock, wherein the catalyst comprises between 8 to 20 wt % molybdenum and between 2 to 8 wt % cobalt on a support, wherein the support comprises alumina and amorphous silica alumina separating liquid hydrocarbons from an effluent from said conversion zone;

isomerizing said liquid hydrocarbons to produce an isomerized effluent having a greater concentration of branched paraffins than said liquid hydrocarbons; and fractionating said isomerized effluent to recover one or more transportation fuel streams.

13. The process of claim 12 wherein the conversion zone also receives water.

* * * * *